No. 649,360. Patented May 8, 1900.
J. H. RUCH.
UNIVERSAL JOINT FOR HORSE POWER MECHANISM, &c.
(Application filed Feb. 16, 1900.)
(No Model.)
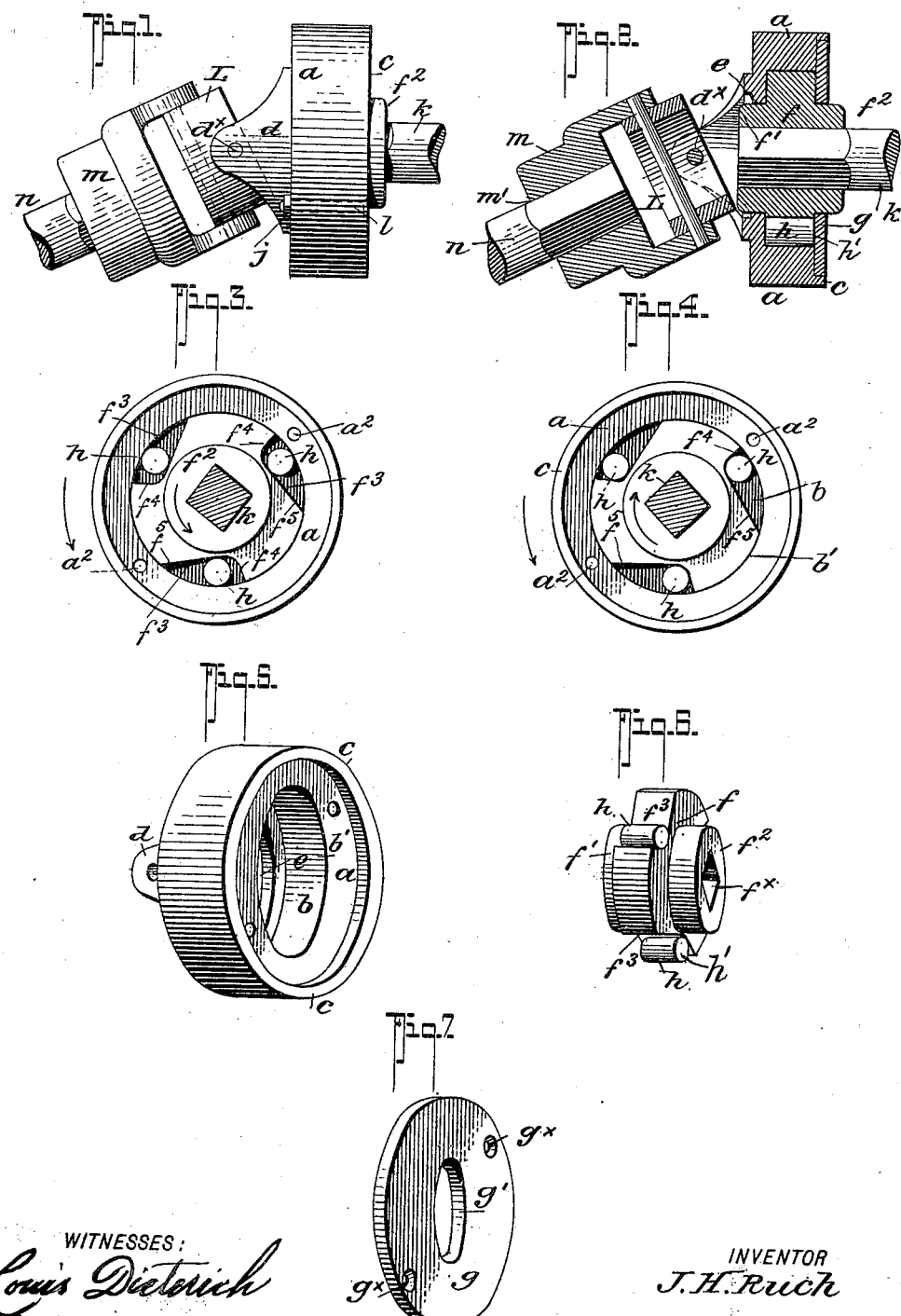
WITNESSES:
Louis Dieterich
C. McCormic
INVENTOR
J. H. Ruch
BY
Fred G. Dieterich & Co.
ATTORNEY

UNITED STATES PATENT OFFICE.

JOHN H. RUCH, OF ELGIN, ILLINOIS.

UNIVERSAL JOINT FOR HORSE-POWER MECHANISM, &c.

SPECIFICATION forming part of Letters Patent No. 649,360, dated May 8, 1900.

Application filed February 16, 1900. Serial No. 5,488. (No model.)

*To all whom it may concern:*

Be it known that I, JOHN H. RUCH, residing at Elgin, in the county of Kane and State of Illinois, have invented a new and Improved Universal Joint for Horse-Power Mechanism, &c., of which the following is a specification.

This invention is in the nature of an improved universal joint for horse-power and other kindred mechanisms; and it primarily seeks to provide a device of this character in the form of a slip-knuckle in which the clutch mechanism can be quickly set to provide for imparting motion in reverse directions and in which the coacting parts are so arranged as to take off the strain on the power when stopping and whereby to allow any machinery that may be connected with the power to gradually stop without the usual jarring and strain incident in the use of rigid coupling.

This invention comprehends a construction of slip-knuckle for universal-joint devices in which the several parts are so arranged as to be easily and economically made and in which the clutch device proper and the casing therefor involve such correlation of parts that access can be quickly had to the clutch-hub when it is desired to set the same for reverse movement.

In its subordinate features this invention comprehends certain details of construction and novel combinations of parts, all of which will hereinafter be first described and then particularly pointed out in the appended claims, reference being had to the accompanying drawings, in which—

Figure 1 is a side elevation of my improvement. Fig. 2 is a longitudinal section thereof. Fig. 3 is a front view of the clutch-casing, the cap-plate being removed and the hub and the roller shown to impart motion to the casing in the direction indicated by the arrow. Fig. 4 is a similar view and illustrates the manner in which the clutch-rollers $h$ set when the clutch-hub is adjusted to turn freely within the casing or pulley and in a reverse direction to the movement of the said casing. Fig. 5 is a detail view of the casing. Fig. 6 is a similar view of the clutch hub and rollers, and Fig. 7 is a like detail view of the cap-plate.

In the practical construction my invention embodies a casing having a solid annular portion $a$, surrounding a central socket $b$, said portion $a$, at one side and at the peripheral edge thereof, having an outwardly-projecting flange $c$, the purpose of which will presently appear. Upon the rear face the casing portion $a$ has a pair of diametrically-oppositely-disposed outwardly-projecting ears $d$, and at a point between the ears $d$ the rear wall of the casing has a circular opening $e$, in which projects and rotates the reduced extension $f'$ of the clutch-hub $f$. The clutch-hub $f$ comprises a body member adapted to be concentrically held within the socket $b$ of the casing and is of a diameter approximately that of the socket, whereby its peripheral edge will travel snugly against the wall $b'$ of the said socket, as clearly shown in Figs. 3 and 4. The clutch-hub $f$ is also provided with a reduced lateral extension $f^2$, that fits and rotates within the circular aperture $g'$ of the cap-plate $g$, which is adapted to lie flat against the annular portion $a$ of the casing and hold the clutch-hub, together with the clutch-rollers, in position within the casing.

By providing the casing with a projecting flange $c$, as shown, the said flange serves as a dust-guard for the interior thereof.

It will be noticed by reference to Fig. 2 that by reason of the clutch-hub $f$ being reduced at the opposite sides into short hub extensions the back wall of the casing at one side and the cap $g$ at the other side will serve to hold the said clutch-body $f$ against lateral play and to rotate in a fixed plane within the socket, such rotation of the hub $f$ being essential in my form of device to properly maintain the clutch-rollers in position to positively grip the casing and the body $f$ when the said members are moved to a clutching position, such arrangement of parts being also provided to reduce the danger of the said rollers (designated by $h$) from having lateral movement within the space in which they lie and work.

The clutch-body $f$ has a plurality of recesses $f^3$ in its peripheral face of like construction, each of which has a radially-disposed abutment or seat $f^4$ and a tangentially-extended inclined base $f^5$, beginning at the bottom of the seat $f^4$ and terminating at the peripheral edge of the body $f$.

The rollers $h$ are of a length equal to the depth of the socket $b$ and have their ends $h'$ movable in close contact with the base of the socket and cap-plate.

$l$ indicates headed bolts that pass through the rear face of the casing through apertures $a^3$ in the solid part thereof and through registering apertures $g^\times$ in the cap-plate, their outer ends being threaded to receive the securing-nuts $j$.

The clutch-hub $f$ has a central non-circular aperture $f^\times$ to receive the similar-shaped end of the power-shaft $k$.

L indicates a sleeve held to rock between the ears $d$ of the casing, the same being mounted upon a stub-pin $d^\times$, extending from one ear to the other, and $m$ designates a knuckle pivotally connected to the sleeve L to swing in the direction at right angles to the swinging motion of the said sleeve L, the said knuckle $m$ having a non-circular socket $m'$ to receive the non-circular end of the drive or power-transmitting shaft $n$.

From the foregoing description, taken in connection with the accompanying drawings, it is thought the advantages of my improved construction will be readily apparent.

In my form of knuckle or joint the use of pawls and springs are dispensed with, and by reason of the peculiar arrangement of the several parts in case of any accident to the machinery the horse-power may come to a sudden stop, and as it does the slip-knuckle will release itself and permit the rest of the machinery in connection therewith to come to a gradual stop.

I am aware that clutch-pulleys have heretofore been provided with a hub having tangentially-arranged recesses and clutch balls or rollers held in recesses for clutching the hub and the pulley when the hub is turned in one direction, and I do not broadly make any claim to such construction.

My invention lies, essentially, in the detailed construction and arrangement of the several parts, whereby a device for the purposes described can be very economically constructed and readily set for causing the casing to be moved in opposite directions and in which the clutch-hub and the clutch-rollers will always be maintained in a proper position to effect a clutching operation and the danger of the rollers and the clutch-hub becoming twisted by means of lateral motion or otherwise entirely overcome.

Having thus described my invention, what I claim, and desire to secure by Letters Patent, is—

1. In a coupling mechanism as described; the combination with the casing having a central socket; a solid annular wall surrounding the socket, and an annular flange projected laterally at one side from the perimeter of the solid annular wall, said casing also having a central circular aperture in the side that forms the face of the socket; of a central apertured cap-plate adapted to form one side of the casing; means for detachably securing the cap-plate in position; a clutch-hub comprising a body portion having a diameter and thickness equal that of the casing-socket and having lateral extensions fitting the opening in the solid side of the casing and the cap-plate, said body portion having a central non-circular opening, and a plurality of recesses in its peripheral face, said recesses having radial seat portions; and base portions tangentially inclined upward; said recesses extending the full width of the body portion; and clutch-rollers loosely mounted in the said recesses, said rollers extending across the full width of the clutch-body, as specified.

2. The hereinbefore-described improvement, consisting of a casing having one side solid and the other side open; and an annular solid portion $a$, terminating on the open side in a laterally-extending annular flange, the aforesaid solid side having a circular opening communicating with the socket formed by the portion $a$, and having a pair of integral laterally-projecting ears; a knuckle-sleeve fulcrumed between the ears to swing in one direction; a knuckle having a shaft-receiving socket fulcrumed in the knuckle-sleeve to swing at right angles to the swing of the said sleeve; a concentric clutch member held within the casing-socket and having centrally-disposed laterally-extended members, said clutch member having transverse non-circular apertures to receive the power-shaft and cap-plate having a central circular aperture adapted to fit over and form a removable side of the casing; the screw-bolts and nuts for securing the cap-plate, the lateral extensions of the clutch being arranged for a reversible insertion within the central openings within the casing and the cap-plate, the clutch-body having recesses in its peripheral face formed each of a radially-disposed seat portion and a base portion extending tangentially outward from the seat said recesses extending the full length of the clutch-body; and a roller-grip held within each recess, said roller-grip extending across the full width of the face of the clutch-body, all being arranged substantially as shown and described.

JOHN H. RUCH.

Witnesses:
W. E. ELLIOTT,
W. A. SHIMP.